United States Patent
Hayami

(10) Patent No.: US 9,940,334 B2
(45) Date of Patent: Apr. 10, 2018

(54) IMAGE FORMING APPARATUS AND CONTROL METHOD THEREOF

(71) Applicant: CANON KABUSHIKI KAISHA, Tokyo (JP)

(72) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/227,798

(22) Filed: Aug. 3, 2016

(65) Prior Publication Data

US 2017/0039215 A1    Feb. 9, 2017

(30) Foreign Application Priority Data

Aug. 5, 2015 (JP) ................................ 2015-155459

(51) Int. Cl.

| H04N 1/04 | (2006.01) |
|---|---|
| G06F 17/30 | (2006.01) |
| H04N 1/21 | (2006.01) |
| G06F 9/445 | (2018.01) |
| G06F 21/30 | (2013.01) |

(52) U.S. Cl.
CPC ......... *G06F 17/30117* (2013.01); *G06F 8/61* (2013.01); *G06F 8/62* (2013.01); *G06F 8/65* (2013.01); *G06F 21/30* (2013.01); *H04N 1/21* (2013.01); *H04N 2201/218* (2013.01)

(58) Field of Classification Search
CPC .......................... H04N 1/21; H04N 2201/218
USPC ....................... 358/1.16, 1.15, 1.14
See application file for complete search history.

(56) References Cited

U.S. PATENT DOCUMENTS

| 2002/0077999 | A1* | 6/2002 | Fergus ............... G06F 21/6209 |
|---|---|---|---|
| 2006/0272020 | A1* | 11/2006 | Gardner ............... G06F 9/4411 |
| | | | 726/23 |
| 2007/0008583 | A1* | 1/2007 | Araki ...................... G06F 8/20 |
| | | | 358/1.15 |
| 2011/0125655 | A1* | 5/2011 | Chiyo .................... G06F 21/10 |
| | | | 705/310 |
| 2014/0067879 | A1* | 3/2014 | Ahn ................. G06F 17/30312 |
| | | | 707/812 |
| 2014/0366034 | A1* | 12/2014 | Fujisawa ............... G06F 9/5016 |
| | | | 718/104 |

FOREIGN PATENT DOCUMENTS

JP    09-034755 A    2/1997

\* cited by examiner

*Primary Examiner* — Houshang Safaipour
(74) *Attorney, Agent, or Firm* — Canon U.S.A., Inc. IP Division

(57) ABSTRACT

An image forming apparatus can prevent deletion of necessary data, when partially deleting a bundle development area, wherein the image forming apparatus holds information for identifying a file to be treated as a deletion target exception when an application is deleted, specifying an application to be a deletion target from among a plurality of kinds of applications, and deleting a file related to the specified application, such that in deletion, the file, serving as the deletion target exception, identified based on the held information, is not deleted.

13 Claims, 13 Drawing Sheets

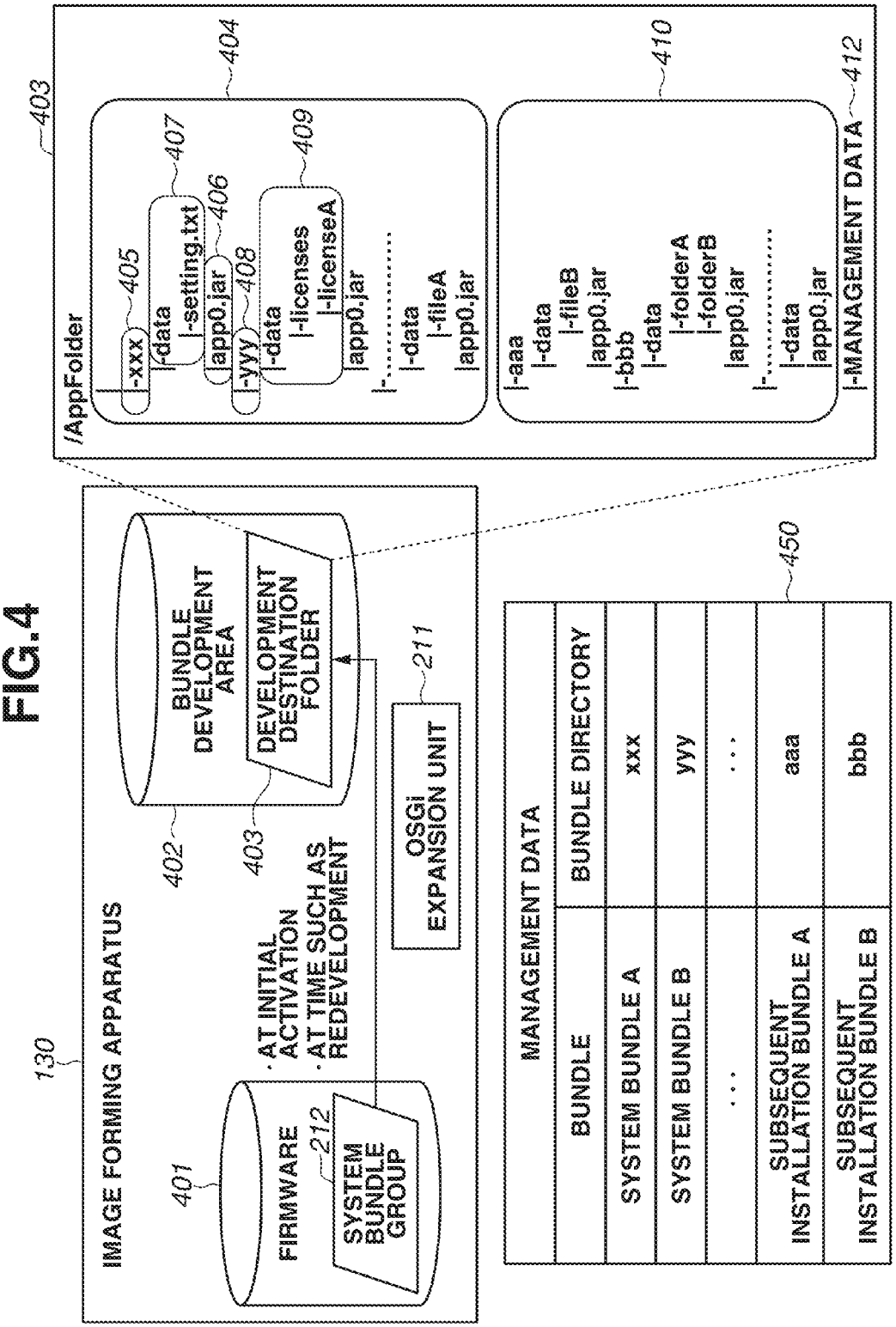

FIG.9

| DELETION TARGET EXCEPTION BUNDLE 900 | DELETION EXCEPTION FILE/DIRECTORY 901 |
|---|---|
| SYSTEM BUNDLE A | ./data/setting.txt |
| SYSTEM BUNDLE B | ./data/licenses |
| ... | ... |
| ... | ... |

FIG.10

| DELETION TARGET EXCEPTION BUNDLE 1000 | DELETION EXCEPTION PATH 1001 |
|---|---|
| SYSTEM BUNDLE A | xxx/data/setting.txt |
| SYSTEM BUNDLE B | yyy/data/licenses |
| . . . | . . . |
| . . . | . . . |

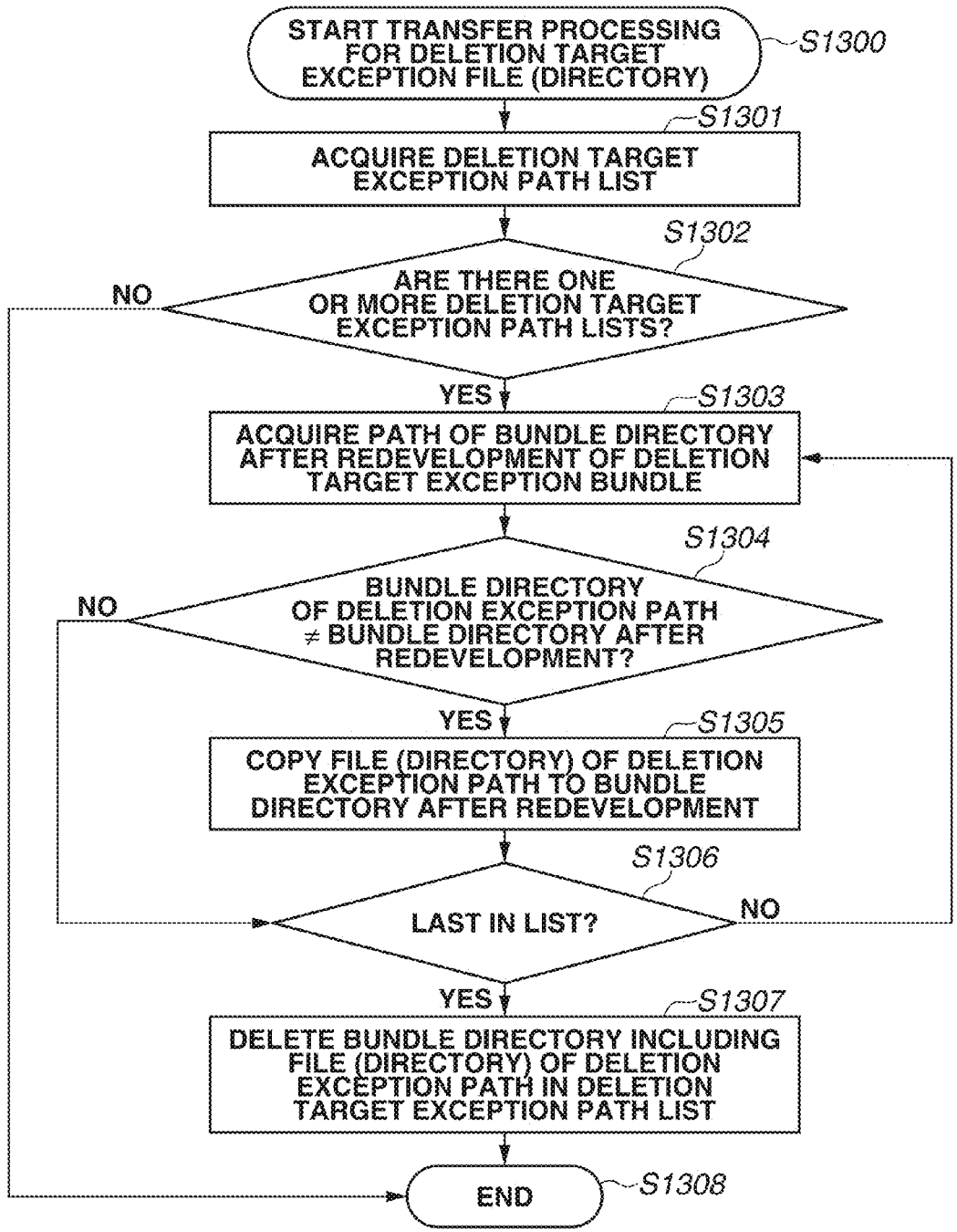

IMAGE FORMING APPARATUS AND CONTROL METHOD THEREOF

BACKGROUND

Field of the Disclosure

The present disclosure relates to, for example, an image forming apparatus on which an application can be installed, and a method for deleting a development area of an application program (hereinafter may be abbreviated as "app".

Description of the Related Art

In recent years, image forming apparatuses have been provided with app operation environments represented by a Java® environment. Technologies for providing expandable apps by utilizing portability of programs of Java® have been discussed. To improve a function and usability of an image forming apparatus, an app that operates in an environment such as the above-mentioned. Java® environment may be created and then installed on the image forming apparatus, so that a desired function can be implemented by this app.

As an app platform, an Open Services Gateway initiative (OSGi) service platform (hereinafter may be simply referred to as OSGi), which is a Java® app platform for a built-in device, may be used. The OSGi defines a bundle as a unit of software-module management, and defines specifications for managing a life cycle including installation, start, stop, update, and uninstallation. Here, the bundle refers to a Java® module. In the present specification, a bundle is synonymous with an app. Therefore, an app may be hereinafter referred to as a "bundle".

In such an app platform, the bundle can provide built-in functions such as copying, scanning, and printing. When or if issues arise in the bundle in this image forming apparatus, it is conceivable to make, as a remedy, an attempt to achieve a recovery, by allowing a serviceman to delete a bundle development area of a memory, and data held by the bundle. In this process, selection of a file to be deleted may be made easy to delete the file, and such a method is discussed in Japanese Patent Application Laid-Open No. 09-034755.

However, in the method discussed in Japanese Patent Application Laid-Open No. 09-034755, it may be sometimes necessary for the serviceman to determine which file is to be deleted. Therefore, it is conceivable to adopt a method for specifying and then deleting the whole or part of a bundle development area and data held by a bundle. However, when the bundle development area and the data are partially specified and then deleted, necessary data may also be deleted depending on how the data is held in the bundle development area, which is an issue.

SUMMARY

The present disclosure is directed to providing a technology for preventing deletion of necessary data, in a case where a bundle development area is partially deleted.

According to an aspect of the present disclosure, an image forming apparatus includes a holding unit configured to hold information for identifying a file to be treated as a deletion target exception, when an application is deleted, a specifying unit configured to specify an application to be a deletion target from among a plurality of kinds of applications, and a deletion unit configured to delete a file related to the specified application, wherein the deletion unit avoids deleting the file, serving as the deletion target exception, identified based on the information held by the holding unit.

Further features of the present disclosure will become apparent from the following description of exemplary embodiments with reference to the attached drawings.

BRIEF DESCRIPTION OF THE DRAWINGS

FIG. 4 is a block diagram illustrating installation of a bundle and a bundle development area serving as an installation destination, in accordance with an embodiment of the subject disclosure.

FIG. 9 is a diagram illustrating an example of the deletion target exception list, in accordance with an embodiment of the subject disclosure.

FIG. 10 is a diagram illustrating an example of a deletion target exception path list, in accordance with an embodiment of the subject disclosure.

FIG. 13 is a flowchart illustrating transfer processing for the deletion target exception file, in accordance with an embodiment of the subject disclosure.

DESCRIPTION OF THE EMBODIMENTS

Exemplary embodiments of the present disclosure will be described below with reference to the attached drawings.

<Hardware Configuration of Image Forming Apparatus>

Figure 1:
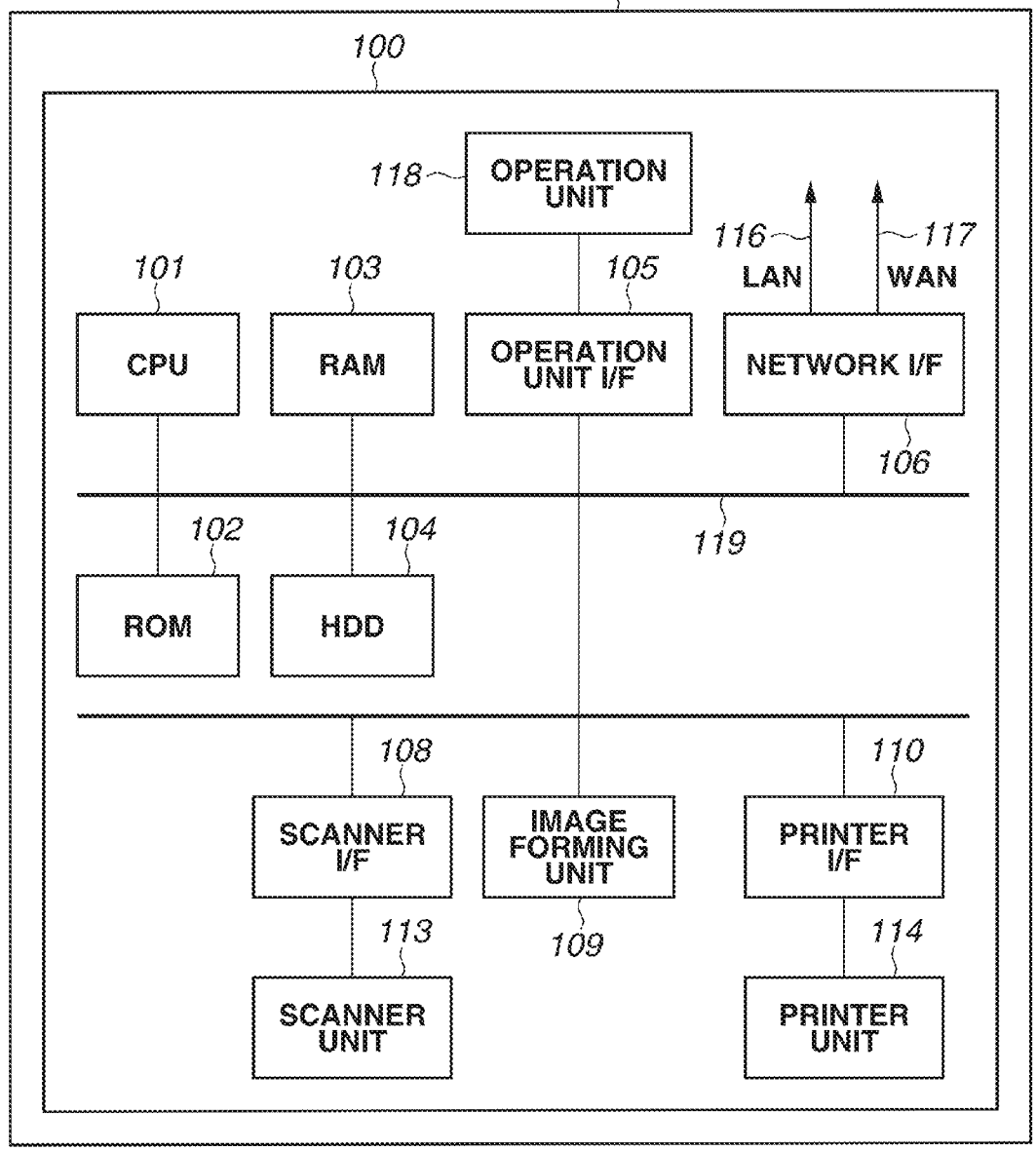
FIG. 1 is a hardware block diagram of an image forming apparatus, in accordance with an embodiment of the subject disclosure.

FIG. 1 is a hardware block diagram of an image forming apparatus 130 according to a first exemplary embodiment. The image forming apparatus 130 has functions such as a print function, a scanner function, and a network communication function.

In FIG. 1, the image forming apparatus 130 includes a controller 100.

The controller 100 is electrically connected to a scanner unit 113 and a printer unit 114. The controller 100 is further connected to an external device via a local area network (LAN) 116.

A central processing unit (CPU) 101 comprehensively controls access to various kinds of hardware being connected, and further comprehensively controls various kinds of processing performed in the controller 100, based on a control program stored in a read only memory (ROM) 102.

The ROM 102 is a nonvolatile read-only storage area, and stores a boot program and firmware of the image forming apparatus 130.

A random access memory (RAM) 103 is a system work memory for operation of the CPU 101, and serves as a memory for temporarily storing various data. The RAM 103 includes a memory such as a Ferroelectric RAM (FRAM) and a static RAM (SRAM), which are capable of holding memory content even after power off, and a dynamic RAM (DRAM) from which memory content is erased after power off.

A hard disk drive (HDD) 104 is a nonvolatile storage area and stores a system bundle. The HDD 104 stores firmware including a bundle, i.e., an application to be installed, which will be described with reference to FIG. 3.

An operation unit interface (I/F) 105 is provided to connect an operation unit 118 and a system bus 119. Specifically, the operation unit I/F 105 receives data from the system bus 119 and displays the received data on the operation unit 118. Further, the operation unit I/F 105 outputs, to the system bus 119, input information from the operation unit 118. A user provides instructions to the image forming apparatus 130, and information is presented to the user via the operation unit 118.

A network I/F 106 is connected to the LAN 116, wide area network (WAN) 117, and the system bus 119 to input/output information from/to outside.

A scanner I/F 108 corrects, modifies, and edits image data received from the scanner unit 113.

An image forming unit 109 performs processing such as orientation change, image compression, and decompression, on image data.

A printer I/F 110 receives the image data from the image forming unit 109, and allows the printer unit 114 to print the image data after the image forming.

<Software Module of Image Forming Apparatus>

Figure 2:
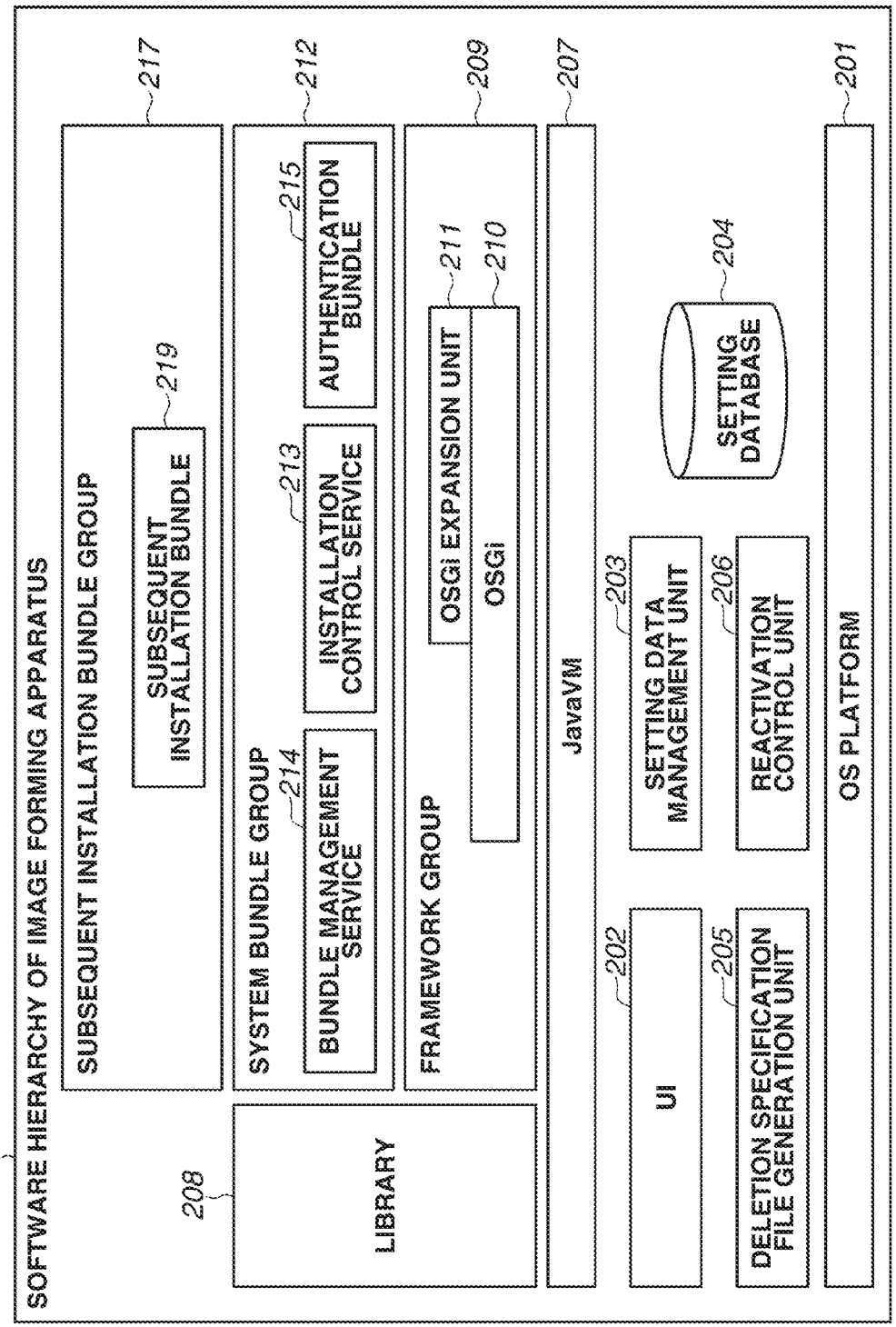
FIG. 2 is a software module hierarchy chart of the image forming apparatus, in accordance with an embodiment of the subject disclosure.

FIG. 2 is a software module hierarchy chart illustrating a software hierarchy 200 of the image forming apparatus 130 according to the first exemplary embodiment. Each software module illustrated in FIG. 2 is stored in the ECM 102 or the HDD 104 and executed by the CPU 101. Further, various kinds of information to be used during the execution are held in the RAM 103 or the HDD 104, and the various kinds of information are exchanged between software functions. Furthermore, communication with an external apparatus is performed using the network I/F 106.

Each software module will be described. The software hierarchy 200 includes an operating system (OS) platform 201.

A user interface (UI) 202 is a user interface module that mediates between the image forming apparatus 130 and user operation when the user (operator) performs various kinds of operation and setting for the image forming apparatus 130. For example, the UI 202 requests execution of processing by transferring input information to the various modules to be described below, or changes data setting, according to the operation of the operator.

A setting database 204 holds setting data of the image forming apparatus 130. The setting database 204 also holds a value of a deletion type to be described below. The setting database 204 also holds a deletion target exception list to be described with reference to FIG. 9. A setting data management unit 203 manages these pieces of data. Each bundle can be acquired by referring to the setting data management unit 203 for a value of data.

A deletion specification file generation unit 205 is a module for generating a deletion specification file that indicates a deletion target when deletion is executed from a menu.

A reactivation control unit 206 is a module for reactivating the image forming apparatus 130 in response to a reactivation instruction when this instruction is issued.

A configuration on a Java® side will be described.

A software platform on the Java® side is configured as a run-time environment of a Java® virtual machine (VM) 207. This software platform includes the Java® VM 207 as an interpreter, a library 208, and a framework group 209. The library 208 includes a standard application programming interface (API) library. The framework group 209 includes an Open Services Gateway initiative (OSGi) service platform (hereinafter simply referred to as OSGi) 210. The OSGi 210 allows the Java® VM 207 to operate a plurality of bundles. Further, an OSGi expansion unit 211 indicates that function expansion is allowed as necessary within the specifications of the OSGi 210. The OSGi 210 and the OSGi expansion unit 211 perform management of the life cycle of a bundle and provide an inter-bundle communication function, for example.

A system bundle group 212 including a plurality of system bundles is provided on the OSGi 210. These system bundles are installed by the OSGi expansion unit 211 from the stored firmware, when no development destination folder is present at the initial activation or when an update flag indicating that an update is necessary is present at a predetermined location. This installation is illustrated in FIG. 4.

The system bundle group 212 includes a bundle management service 214 for managing a plurality of bundles. The bundle management service 214 is provided to perform addition of a new bundle, update, and deletion. The bundle management service 214 performs bundle addition, update, and deletion by using an installation control service 213.

The system bundle group 212 includes an authentication bundle 215 for performing an authentication function of the image forming apparatus 130. The authentication bundle 215 has such a characteristic that the authentication bundle 215 cannot stop because any bundle may inquire about authentication information at any time during user authentication for the image forming apparatus 130. If the authentication bundle 215 stops, the authentication information cannot be acquired. Therefore, if there is a bundle using data linked to authentication information, this bundle fails to acquire the data, thereby having trouble in operation. Here, the authentication information refers to information such as an authentication name and an e-mail address of a user currently authenticated by the image forming apparatus 130. A plurality of authentication bundles 215 may be installed. However, each of the authentication bundles 215 has the characteristic of not being allowed to stop as described above. Therefore, only one of the authentication bundles 215 operates during the activation of the image forming apparatus 130. Information indicating which one of the authentication bundles 215 is in operation is held as a setting of the OSGi expansion unit 211.

Figure 3:
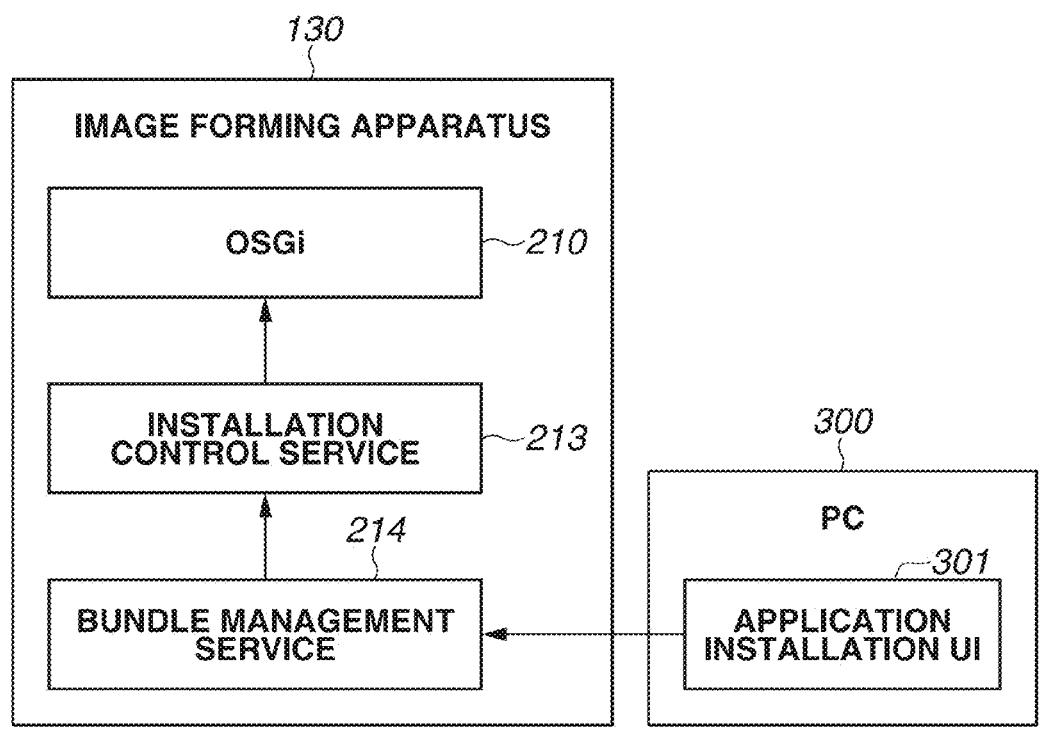
FIG. 3 is a block diagram illustrating a flow of installing a bundle, in accordance with an embodiment of the subject disclosure.

Meanwhile, there is a subsequent installation bundle group 217 including bundles of a type to be installed subsequently. This bundle installation is illustrated in FIG. 3. The subsequent installation bundle group 217 includes a subsequent installation bundle 219 that is an additional application for providing a user with various kinds of processing in the image forming apparatus 130. Examples of the subsequent installation bundle 219 include a bundle for performing image modification and compression, and a bundle for performing department management such as print restriction.

The subsequent installation bundle 219, which implements various functions, operates under management of the bundle management service 214. The bundle management service 214 holds, for example, bundle information including a version of a bundle added to the bundles being managed, and license information.

<Installation of Bundle>

FIG. 3 is a block diagram illustrating a flow in which a user installs the subsequent installation bundle 219 from a personal computer (PC) 300 to the image forming apparatus 130.

The user causes a web browser of the PC 300 to display an application installation UI 301, and installs a bundle desired to be installed by specifying this bundle in the application installation UI 301. The bundle management service 214 receives the bundle specified in the application installation UI 301, and sends the received bundle to the installation control service 213. Upon receiving the bundle, the installation control service 213 requests the OSGi 210 to perform installation, and the OSGi 210 installs the specified bundle. The bundle management service 214 manages the installed bundle.

<Example of Bundle Development Area>

FIG. 4 is a block diagram illustrating a flow in which the OSGi expansion unit 211 installs the system bundle group 212 from the firmware to a bundle development area 402 in the image forming apparatus 130. This block diagram also illustrates the bundle development area 402 after development.

A development destination folder 403 is present in the bundle development area 402. The development destination folder 403 is created by the OSGi expansion unit 211, usually at the initial activation, or at the activation immediately after the development destination folder 403 is deleted.

When detecting absence of the development destination folder 403 of a bundle, or when detecting absence of a development destination folder 404 for system bundle group, the OSGi expansion unit 211 performs installation processing. Specifically, the OSGi expansion unit 211 installs the system bundle group 212 stored in firmware 401, to the development destination folder 403 in the bundle development area 402.

A folder named AppFolder representing the development destination folder 403 will be described. This folder includes the development destination folder 404 for system bundle group and a development destination folder 410 for subsequent installation bundle group. In the development destination folder 404 for system bundle group, the system bundle group 212 provided in the firmware 401 is developed. In the development destination folder 410 for subsequent installation bundle group, the subsequent installation bundle group 217 is developed.

The OSGi expansion unit 211 creates a folder for each of the installed bundles. This folder will be hereinafter referred to as a bundle directory. The bundle directory can have a unique name created from information such as an installation date and time. FIG. 4 illustrates a case where a system bundle A is installed in a bundle directory xxx 405. In the bundle directory xxx 405, an installed jar 406 named app0.jar is placed. Further, a data folder 407 for storing data of each bundle is placed. In this case, a setting data setting.txt file of the system bundle A is stored.

In addition, a system bundle B is installed in a bundle directory yyy 408. A jar installed as with the system bundle A is named app0.jar and placed. Further, bundle license data held by the system bundle B is stored in a licenses folder in a data folder 409. In this case, a licenseA file that is a license of the subsequent installation bundle A is held.

On the other hand, by the method illustrated in FIG. 3, the subsequent installation bundle subsequently installed by the user is also installed in a directory configuration similar to that in the development destination folder 404 for system bundle group. This installation is indicated by the development destination folder 410 for subsequent installation bundle group.

The development destination folder 403 includes, in addition to the development destination folder 404 for system bundle group and the development destination folder 410 for subsequent installation bundle group, management data 412 for managing these pieces of installed information. The management data 412 holds, as management data, data of a table 450 for managing a correspondence between a bundle and a bundle directory. Therefore, once a bundle is found, a bundle directory corresponding to this bundle can be found.

Further, the management data 412 holds setting information indicating which one of the authentication bundles 215 described with reference to FIG. 2 is in operation.

As for segmentation for specifying a part of the bundle development area, it is conceivable to segment the bundle development area from various viewpoints. However, even if a part can be finely specified, when specifiable parts are excessively minute, a serviceman may have difficulty in determining which part to specify and thus, usability is poor. When the segmentation is considered from the viewpoint of addressing a problem in a service, it is desirable to adopt segmentation that results in parts readily recognizable by the serviceman, while being highly likely to solve the problem.

Employed here is a method of segmenting the bundle development area, based on the development destination folder 404 for system bundle group and the development destination folder 410 for subsequent installation bundle group. Further, whether to delete each of all the bundle directories or only the data folder 407 can be selected and specified.

In this way, a bundle is installed in a folder (directory) of this bundle. A file to be installed includes a jar file and a data folder that may be collectively referred to as a bundle-associated file. The jar file is a file in which Java® bytecode (i.e., substance of a program) and resources to be used thereby are collectively archived. It may be said that the jar file is a bundle, i.e., an application program itself. In the present exemplary embodiment, a plurality of kinds of applications is held in a bundle development area, namely, an application holding unit.

Figure 5A:
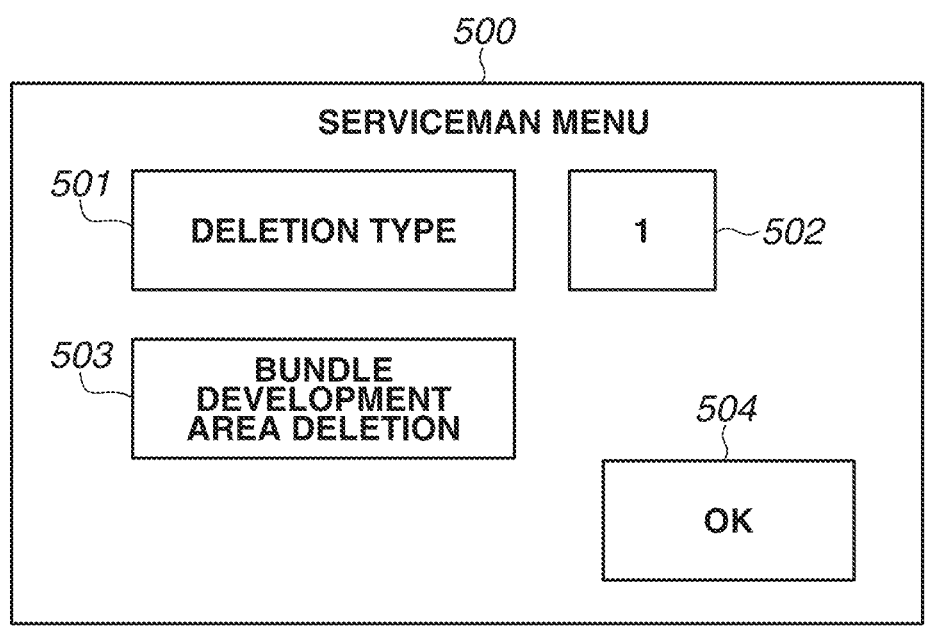
FIGS. 5A and 5B illustrate a user interface (UI) necessary at the time of deletion, and a deletion specification file, respectively, each in accordance with an embodiment of the subject disclosure.

FIG. 5A is a diagram illustrating a UI 500 for specifying an area that is a part desired to be deleted in a bundle development area. The UI 500 is displayed on the operation unit 118.

A serviceman menu in the UI 500 displays a list of functions that are necessary when the serviceman provides user support. When attempting to delete a bundle development area, the user performs the following operation.

The user first selects a deletion type 501 indicating an area that is a part desired to be deleted in the bundle development area. Next, the user inputs a deletion type number 502, and then presses an OK button 504.

In this example, 1 is specified as the deletion type 501, and in this case, the data folder 407 of the system bundle is to be deleted. Further, if 2 is specified, the data folder of a subsequent installation bundle can be deleted, and if 3 is specified, a bundle directory of a system bundle can be deleted. Furthermore, if 4 is specified, a bundle directory of a subsequent installation bundle can be deleted.

After specifying the deletion type 501, the user selects a bundle development area deletion 503, and then presses the OK button 504. Afterward, when the image forming apparatus 130 is reactivated, a target file specified by the deletion type 501 in the bundle development area 402 is deleted.

Figure 5B:
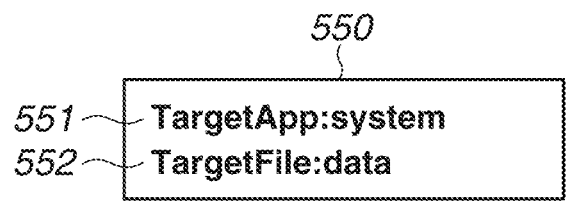

FIG. 5B is a diagram illustrating' an example of description of a deletion specification file 550 for transmitting information indicating the deletion type specified in FIG. 5A to the OSGi expansion unit 211. For a TargetApp 551 that is a key character string, a deletion target bundle is specified. For a TargetFile 552 that is a key character string, a content indicating which one of files held by the deletion target bundle is to be deleted is specified.

In this example, "system" is specified for the TargetApp 551, and "data" is specified for the TargetFile 552. Accordingly, the data folder 407 of the system bundle is to be deleted.

Figure 6:
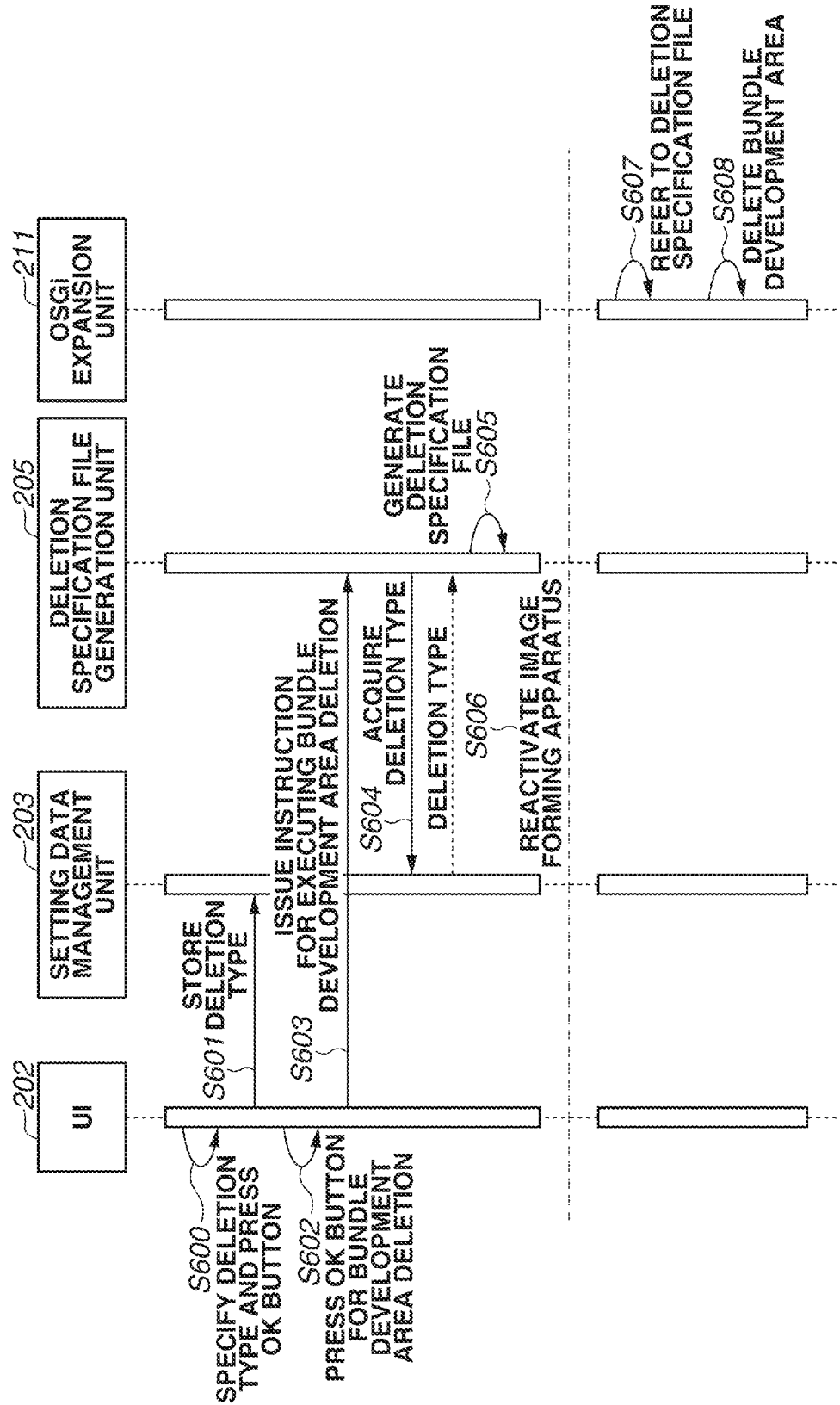
FIG. 6 is a diagram illustrating a sequence from specification of a deletion type number to deletion processing after reactivation, in accordance with an embodiment of the subject disclosure.

FIG. 6 is a diagram illustrating a sequence from specification of a part of a bundle development area to deletion processing after reactivation.

In step S600, in a state where the deletion type 501 is selected from the UI 500, the user inputs the deletion type number 502, and then presses the OK button 504. In step S601, the UI 202 requests the setting data management unit 203 to store the input deletion type number into the setting database 204.

In step S602, in a state where the bundle development area deletion 503 is selected, the user presses the OK button 504. In step S603, the UI 202 issues an instruction for executing' development area deletion to the deletion specification file generation unit 205. In step S604, the deletion specification file generation unit 205 acquires the value of the specified deletion type (i.e., the deletion type number) from the setting data management unit 203. In step S605, the deletion specification file generation unit 205 generates the deletion specification file 550 based on the acquired value of the deletion type.

In step S606, the user reactivates the image forming apparatus 130. In step S607, the OSGi expansion unit 211 refers to the deletion specification file 550. In step S608, the OSGi expansion unit 211 deletes the bundle development area according to the specification described in the deletion specification file 550. The flow in step S607 and step S608 of the OSGi expansion unit 211 is illustrated in FIG. 7.

<Flow of Bundle Development Area Deletion by OSGi Expansion>

Figure 7:
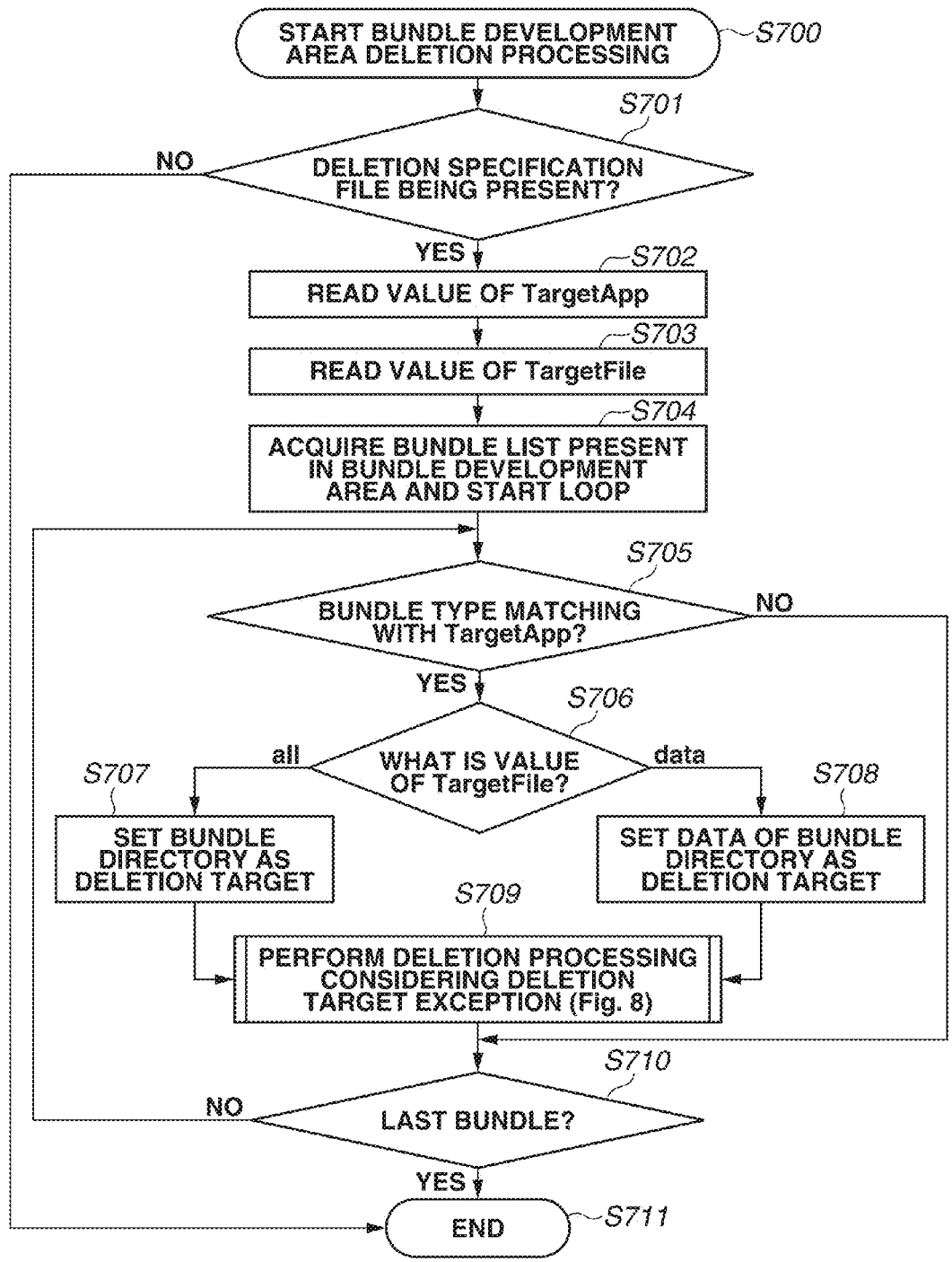
FIG. 7 is a flowchart illustrating a flow of deleting a bundle development area upon activation of the image forming apparatus, in accordance with an embodiment of the subject disclosure.

FIG. 7 is a flowchart illustrating a flow in which the OSGi expansion unit 211 deletes the bundle development area upon the activation.

In step S700, the bundle development area deletion processing starts. In step S701, the OSGi expansion unit 211 checks whether the deletion specification file 550 is present. If the deletion specification file 550 is not present (NO in step S701), the processing proceeds to step S711, and this processing ends. If the deletion specification file 550 is present (YES in step S701), the processing proceeds to step S702.

In step S702, the OSGi expansion unit. 211 reads the value of the bundle specification (specifically, the TargetApp 551) from the deletion specification file 550, and saves the read value to the memory. Then, the processing proceeds to step S703. In step S703, the OSGi expansion unit 211 reads the value of the TargetFile 552, and saves the read value to the memory. Then, the processing proceeds to step S704. In step S704, the OSGi expansion unit 211 acquires a bundle list installed in the bundle development area from the bundle management service 214, and then the processing proceeds to step S705.

In step S705, it is checked whether the bundle type of the first bundle in the bundle list matches with the TargetApp 551 read in step S702. The bundle type is either a subsequent installation bundle (normal) or a system bundle (system). When "normal" is specified for the TargetApp 551, a match is assumed if the bundle type is a subsequent installation bundle. When "system" is specified for the TargetApp 551, a match is assumed if the bundle type is a system bundle. When there is no match for either case (NO in step S705), the processing proceeds to step S710. When there is a match (YES in step S705), the processing proceeds to step S706. In step S706, it is determined what the value of the TargetFile 552 read in step S703 is. When the value of the TargetFile 552 is "all" in step S706, the processing proceeds to step S707. In step S707, the bundle directory of the bundle is set as the deletion target, and proceeds to step S709. When the value of the TargetFile 552 is "data" in step S706, the processing proceeds to step S708. In step S708, the data folder 407 of the bundle directory of the bundle is set as the deletion target, and the processing proceeds to step S709. In step S709, the deletion processing is performed considering a deletion target exception. The deletion processing considering' the deletion target exception will be described with reference to FIG. 8. In step S710, it is determined whether the current bundle is the last bundle in the bundle list. If it is determined that the current bundle is not the last bundle (NO in step S710), the processing returns to step S705 for a repeat. If it is determined that the current bundle is the last bundle (YES in step S710), the processing proceeds to step S711, and this processing ends.

Figure 8:
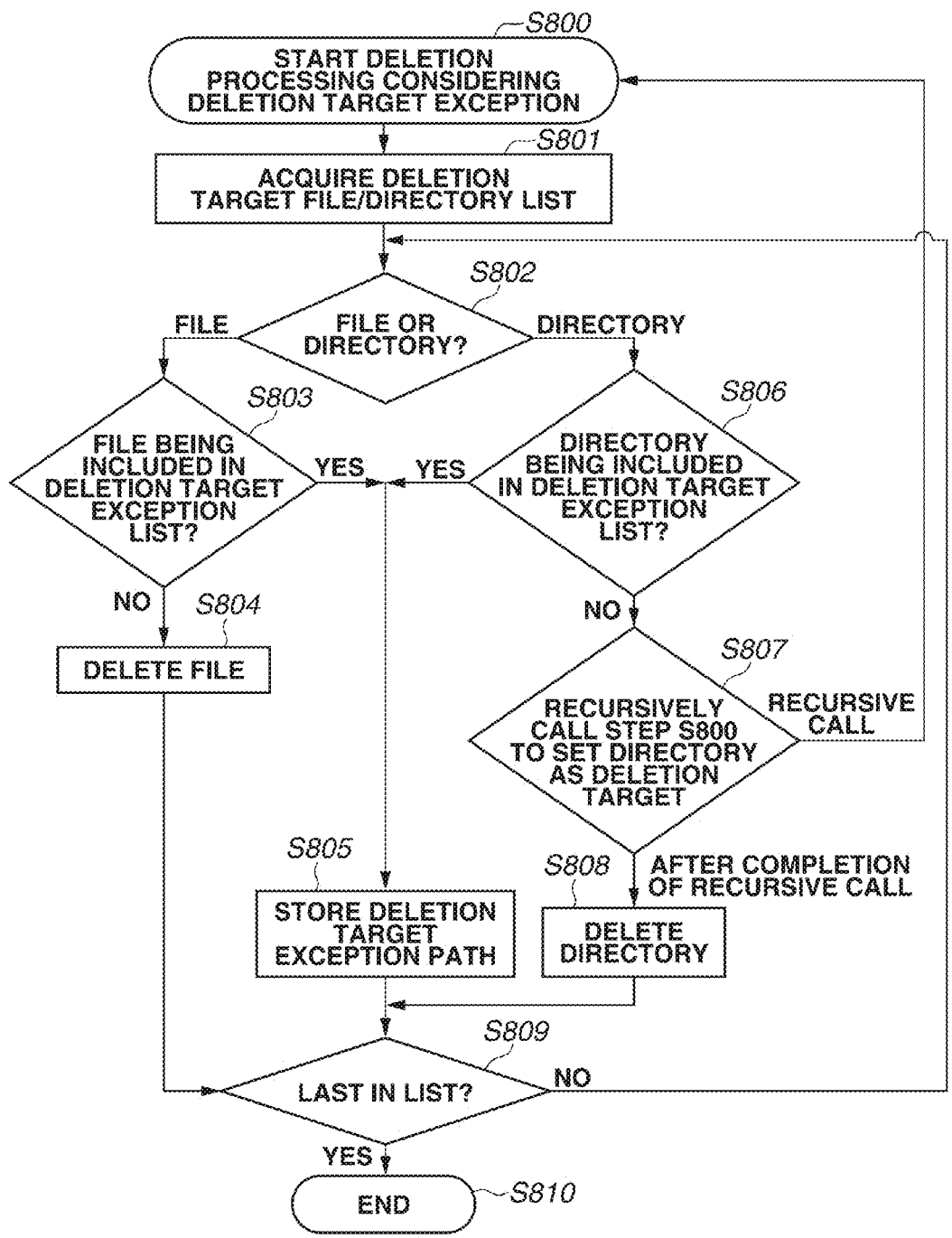
FIG. 8 is a flowchart illustrating a flow of deleting data of a bundle development area considering a deletion target exception list, in accordance with an embodiment of the subject disclosure.

FIG. 8 is a flowchart when the data of the bundle development area is deleted considering' a deletion target exception file (directory) in the deletion target exception list.

The OSGi expansion unit 211 can refer to the deletion target exception list. The deletion target exception list includes files and directories, which may affect consistency of the entire system if the bundle development area is partially deleted. The deletion target exception list is held in the setting database 204.

The deletion target exception list will be described with reference to FIG. 9. FIGS. 9 and 10 each illustrate information for identifying a file to be treated as the deletion target exception.

A deletion target exception bundle 900 indicates which bundle has data to which the file/directory desired to be treated as the deletion target exception belongs. A deletion exception file/directory 901 describes a path, which is a relative path from the bundle directory of each bundle and serves as a path of a file/directory desired to be treated as the deletion target exception. In this example, there is a row in which the deletion target exception bundle 900 is "system bundle A", and the deletion exception file/directory 901 is "./data/setting.txt". This row indicates a file having a path of "bundle directory of system bundle A"/data/setting.txt.

Further, there is a row in which the deletion target exception bundle 900 is "system bundle 13", and the deletion exception file/directory 901 is "./data/licenses". This row indicates a file having a path of "bundle directory of system bundle 13"/data/licenses.

In step S800, the deletion processing considering the deletion target exception starts. In step S801, a deletion target file/directory list is acquired from a file system of the OS. In a case where the processing proceeds from step S707 to step S800, the list is for the file of the bundle directory, and the directory. In a case where the processing proceeds from step S708 to step S800, the list is for the file of the data folder of the bundle directory, and the directory. In step S802, it is determined whether the first in the file/directory list acquired in step S801 is a file or directory. When it is determined that the first is a file in step S802, the processing proceeds to step S803. In step S803, it is determined whether this file is included in the deletion target exception list. When it is determined that the file is not included (NO in step S803), the processing proceeds to step S804. In step S804, the file is deleted. On the other hand, when it is determined that the file is included (YES in step S803), the processing proceeds to step S805. In step S805, instead of deleting the file, the OSGi expansion unit 211 stores the path of the file as a deletion target exception path list illustrated in FIG. 10.

When it is determined that the first is a directory in step S802, the processing proceeds to step S806. In step S806, it is determined whether this directory is included in the deletion target exception list. When it is determined that the directory is not included (NO in step S806), the processing proceeds to step S807. In step S807, step S800 is recursively called to set the directory as the deletion target. Upon completion of this recursive call process, the processing proceeds to step S808. In step S808, the directory is deleted, and then the processing proceeds to step S809. On the other hand, when it is determined that the directory is included (YES in step S806), the processing proceeds to step S805. In step S805, instead of deleting the directory, the OSGi expansion unit 211 stores the path of the directory as the deletion target exception path list illustrated in FIG. 10.

in step S809, it is determined whether the current file/directory is the last in the file/directory list. When it is determined that the current file/directory is not the last (NO in step S809), the processing returns to step S802 for a repeat. On the other hand, when it is determined that the current file/directory is the last (YES in step S809), the processing proceeds to step S810, and this processing ends.

FIG. 10 illustrates a state of the deletion target exception path list generated in step S805.

A deletion target exception bundle 1000 describes which bundle has data to which the file/directory set as the deletion target exception belongs. A deletion exception path 1001 describes an absolute path of the file/directory set as the deletion target exception. FIG. 10 illustrates an example of the file and the directory not deleted according to the deletion target exception list illustrated in FIG. 9. Here, "bundle directory of system bundle A" is xxx, and therefore, the deletion exception path 1001 is "xxx/data/setting.txt". On the other hand, "bundle directory of system bundle B" is yyy, and therefore, the deletion exception path 1001 is "yyy/data/licenses".

By the method described above in the first exemplary embodiment, specifically, the following effects can be obtained.

First Effect Example

Assume that a servlet bundle S for displaying bundle management information on a PC is present as a system bundle. Setting data of the servlet bundle S is located in a data folder of the servlet bundle C serving as the system bundle. There are two ways to access the servlet bundle S; an access method A and an access method B. In a default state, the access method A is on, and the access method B is off. The setting data of the servlet bundle S is updated when this setting is changed. In the default state, the setting data is not present, and in that case, a default operation is performed. In accessing the servlet bundle S, a combination with an authentication bundle is important. When an authentication bundle D is in operation, the access method B needs to be on.

Here, assume that only a file in a system bundle area is to be deleted in a bundle management area. In this case, the setting data of the servlet bundle S serving as the system bundle is deleted, and therefore, the setting returns to the default state. Meanwhile, the management data 412 holds the setting information of the authentication bundle, and therefore, operation information of the authentication bundle remains unchanged. As a result, the access method B returns to the off state that is the default state, and thus, even if the authentication bundle D is in operation, access is not allowed.

According to the first exemplary embodiment, a situation where consistency with the remaining setting collapses due to deletion of some file is prevented, by registering the setting data of the servlet bundle S in the deletion target exception list.

Second Effect Example

Assume that a bundle management service is provided as a system bundle. The bundle management service manages license information, which is used when a subsequent installation bundle is installed, in a license directory of a data folder of the bundle management service serving as the system bundle. The bundle management service performs the management using the data folder thereof (the bundle management service serving as the system bundle) instead of using each bundle directory of the subsequent installation bundle, because this allows collective management and makes it easy to handle the license information.

Here, assume that only a file in a system bundle area is to be deleted in a bundle management area. In this case, the license directory of the bundle management service serving as the system bundle is deleted, and the subsequent installation bundle is not deleted. This is an inconsistent state where although the subsequent installation bundle is present, the license corresponding to this subsequent installation bundle is absent. This situation may adversely affect subsequent processing. According to the first exemplary embodiment, a situation where consistency with the remaining bundles collapses due to deletion of some directory is prevented, by registering the license directory of this bundle management service in the deletion target exception list.

In a second exemplary embodiment, the not-deleted deletion target exception file or directory of the system bundle described in the first exemplary embodiment is considered for redevelopment of the subsequent system bundle. In a case where a bundle directory of a system bundle is deleted, redevelopment processing for the system bundle is subsequently necessary. The case where the bundle directory of the system bundle is deleted corresponds to a case where "system" is specified for the TargetApp 551 and all is specified for the TargetFile 552, in the deletion specification file.

Figure 11:
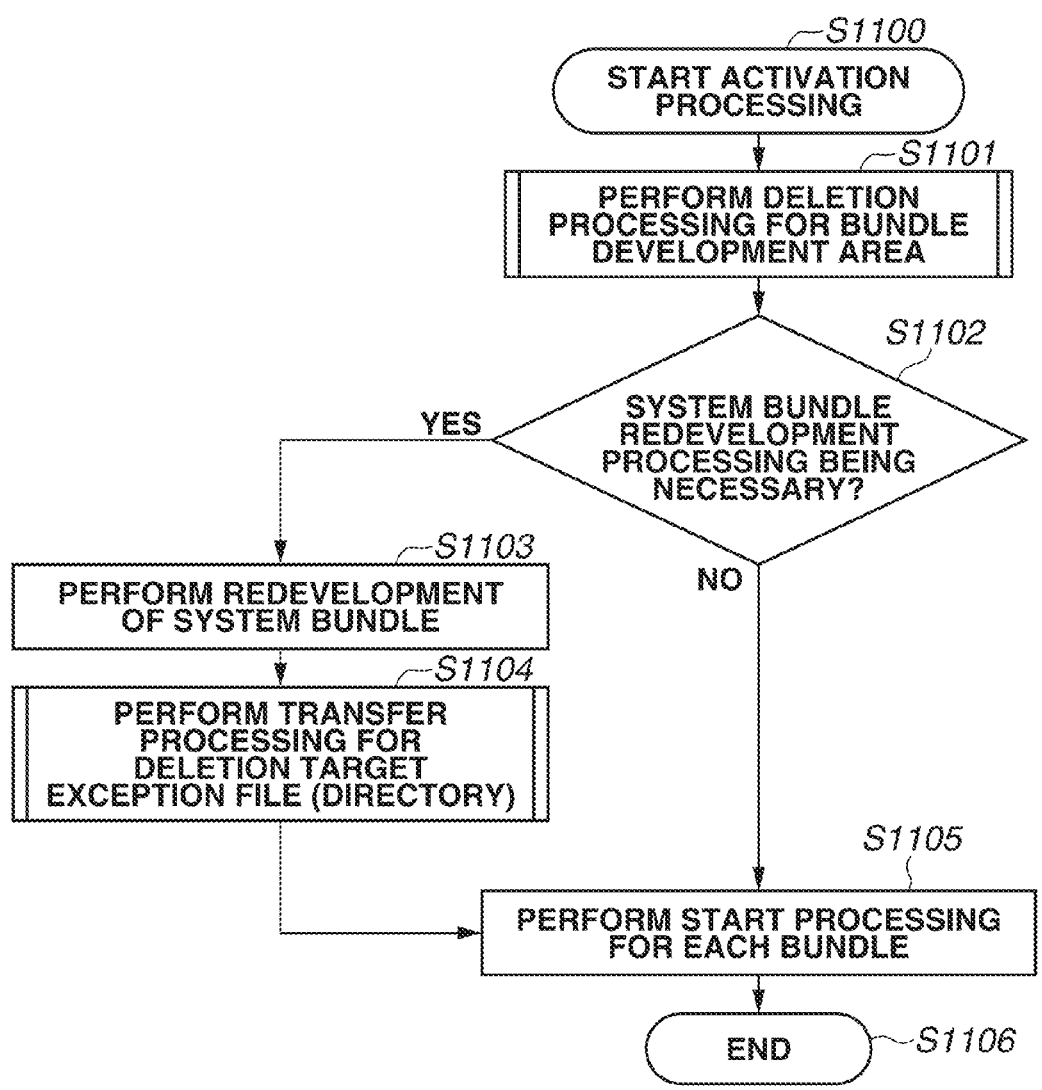
FIG. 11 is a flowchart illustrating a flow from deletion of a bundle development area to redevelopment of a system bundle.

FIG. 11 is a flowchart illustrating an operation of the OSGi expansion unit 211 during activation processing for the image forming apparatus 130.

In step S1100, the activation processing starts. In step S1101, deletion processing for a bundle development area is performed, and then the processing proceeds to step S1102. The processing' in step S1101 corresponds to the flow illustrated in FIG. 7. In step S1102, whether redevelopment processing for a system bundle is necessary is determined based on whether a bundle directory of the system bundle is deleted. When it is determined that the redevelopment processing is necessary (YES in step S1102), the processing proceeds to step S1103. In step S1103, the redevelopment processing for the system bundle is performed. Movement of the bundle directory in this process will be described with reference to FIG. 12A. In step S1104, transfer processing for a deletion target exception file (directory) is performed. Upon completion of the transfer processing, the processing proceeds to step S1105. On the other hand, when it is determined that the redevelopment processing is unnecessary (NO in step S1102), the processing proceeds to step S1105. In step S1105, start processing for each bundle is performed, and then the processing proceeds to step S1106. In step S1106, the activation processing ends.

Figure 12A:
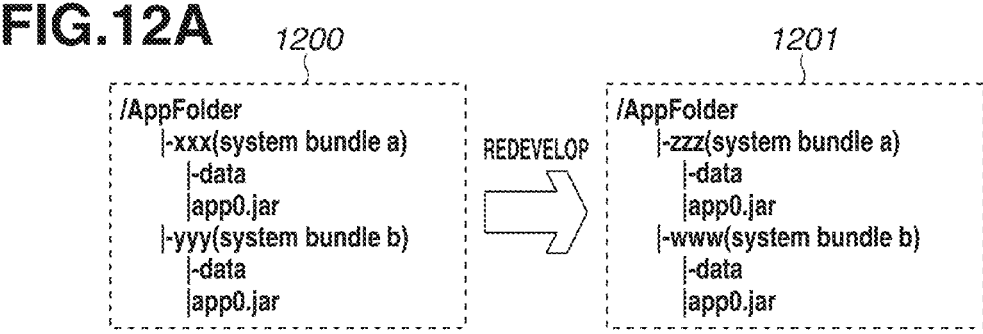
FIGS. 12A and 12B are block diagrams illustrating movement of data to be transferred of the deletion target exception file when redevelopment processing for a system bundle in a bundle development area is executed, each in accordance with an embodiment of the subject disclosure.
Figure 12B:
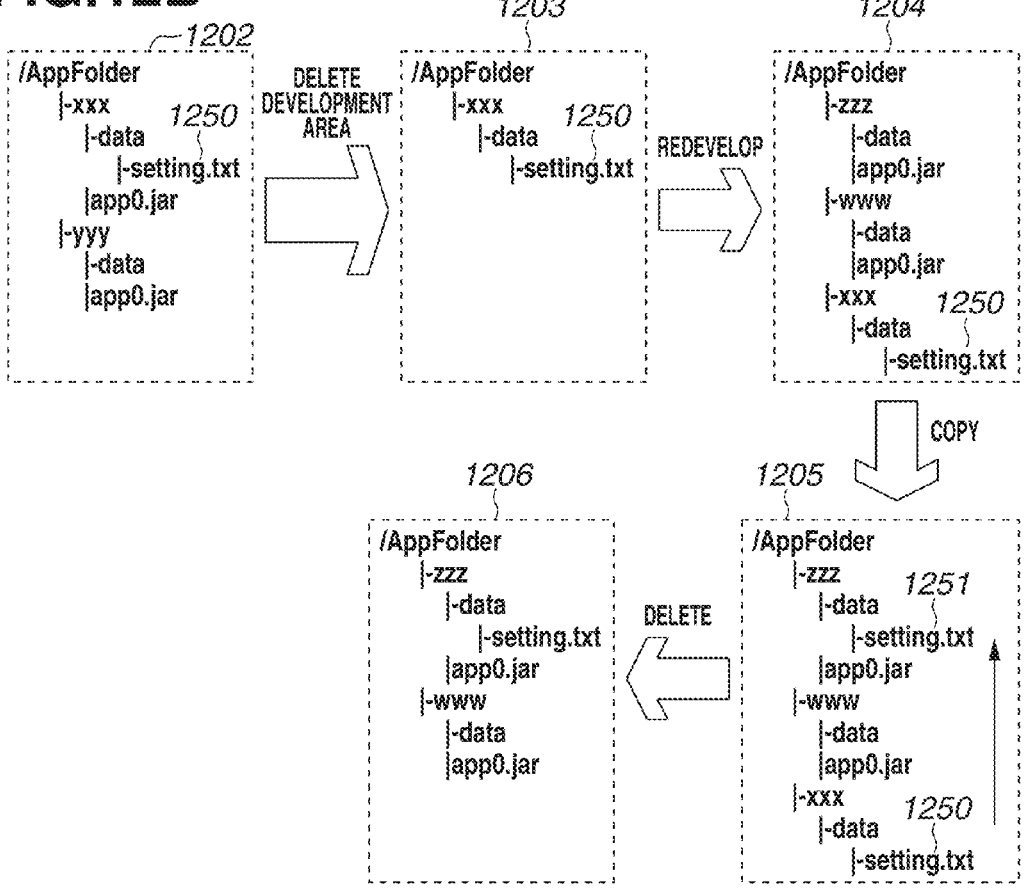

FIGS. 12A and 12B are block diagrams illustrating' movement in the development area when the redevelopment processing for the system bundle of the bundle development area is executed.

FIG. 12A illustrates how the system bundle is handled in the development to the bundle directory. Assume that, in a state 1200, the bundle directory of the system bundle A is xxx, and the bundle directory of the system bundle B is yyy. Afterward, when these bundle directories are deleted once and then redeveloped, the bundle directory of the same system bundle A is zzz, and the bundle directory of the system bundle B is www, as indicated by a state 1201. This is because a unique name created from information such as an installation date and time is provided, as described with reference to FIG. 4. One reason for performing such processing is as follows. If the processing is terminated by, for example, forced shutdown during the development to the bundle directory, trash directory may be left. Therefore, it is desirable to create a new bundle directory, each time the redevelopment is necessary.

FIG. 12B illustrates desirable movement of the deletion target exception file in such redevelopment processing.

Assume that, in a state 1202, a deletion target exception file 1250 (setting.txt) is present in the data folder of the bundle directory xxx of the system bundle A. In a case where the bundle development area is deleted, even if the bundle directory of the system bundle is the deletion target as described in the first exemplary embodiment, this file is not deleted. Therefore, the file remains as indicated by a state 1203. When the system bundle is redeveloped afterward, the bundle directory of the system bundle A becomes zzz, as indicated by a state 1204. Then, in a state 1205, the remaining deletion target exception file 1250 is copied to a data folder 1251 of the new bundle directory zzz of the system bundle A. Subsequently, in a state 1206, the entire xxx folder including the unnecessary deletion target exception file 1250 is deleted. In this way, the deletion target exception file is copied, so that correct use can be continued.

FIG. 13 is a flowchart of the transfer processing for the deletion target exception file illustrated in FIG. 12B.

In step S1300, the transfer processing for the deletion target exception file (directory) starts. In step S1301, the OSGi expansion unit 211 starts loop processing based on the deletion target exception path list illustrated in FIG. 10, which is held in the memory. In step S1302, it is determined whether there are one or more deletion target exception path lists. When it is determined that there is no list (NO in step S1302), the processing proceeds to step S1308, and this processing ends. When it is determined that there are one or more lists (YES in step S1302), the processing proceeds to step S1303. In step S1303, a path of a bundle directory after redevelopment of the deletion target exception bundle 1000 is acquired, and then the processing proceeds to step S1304. When this process is described using the example in FIG. 10, the current bundle directory of the system bundle A is acquired. The current bundle directory of the system bundle A becomes zzz as described with reference to FIG. 12B. In step S1304, it is determined whether the path of the bundle directory of the deletion exception path 1001 is different from the path of the bundle directory after the redevelopment. When this process is described using the example in FIG. 10, the deletion exception path 1001 xxx/data/setting.txt, and thus, in this case, the path of the bundle directory is xxx. This is different from zzz acquired in step S1303 (YES in step S1304) and therefore, the processing proceeds to step S1305. In step S1305, the file (directory) of the deletion exception path 1001 is copied to the bundle directory after the redevelopment. When the paths match with each other (NO in step S1304), the processing proceeds to step S1306. In step S1306, it is determined whether the current processing is for the last in the deletion target exception path list. When there is a remaining path in the list (NO in step S1306), the processing returns to step S1303 for a repeat. When the processing is completed for the all deletion target exception path lists (YES in step S1306), the processing proceeds to step S1307. In step S1307, the bundle directory, which includes the file (directory) of the deletion exception path in the deletion target exception path list, is deleted, and then the processing proceeds to step S1308. When this process is described using the example in FIG. 10, the xxx folder is deleted in a first example, and the yyy folder is deleted in a second example. In step S1308, the transfer processing ends.

As described above, by the method described in the second exemplary embodiment, even if a new bundle directory is created after redevelopment, it is possible to keep using the file/directory left as the deletion target exception.

According to the exemplary embodiments described above, it is possible to prevent deletion of necessary data in deletion of some file by using the deletion target exception list in which files and directories expected to affect the entire system are defined.

According to the exemplary embodiments described above, it is possible to prevent deletion of necessary data, when partially deleting the bundle development area.

Embodiment (s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-155459, filed Aug. 5, 2015, which is hereby incorporated by reference herein in its entirety.

What is claimed is:

1. An image forming apparatus comprising:
a storage configured to store deletion target exception information for identifying a file or a directory that is to be treated as a deletion target exception when a system application is deleted;
one or more processors; and
memory storing instructions that, when executed by the one or more processors, cause the image forming apparatus to perform operations comprising:
specifying an application to be a deletion target from among a plurality of kinds of applications including a system application and a general application, and
deleting, from among files or directories related to the specified application, a file or a directory related to the application excluding the file or the directory that is to be treated as the deletion target exception by using the deletion target exception information,
wherein the general application is an application added to the image forming apparatus, the system application is an application that is able to be redeveloped from firmware, and the file that is to be treated as the deletion target exception when the system application is deleted is a license file of the general application.

2. The image forming apparatus according to claim 1, wherein, in operation of the deleting, deletion is from an application development area.

3. The image forming apparatus according to claim 2,
wherein, after the operation of the deleting, the specified application is redeveloped into a new development area, and
wherein, the file or the directory that is to be treated as the deletion target exception is copied into the new development area by using the deletion target exception information.

4. The image forming apparatus according to claim 3, wherein, after the copying, the file or the directory that serves as the deletion target exception and is present in the development area before the copying is deleted.

5. The image forming apparatus according to claim 1,
wherein, in operation of the specifying, either a file or a directory is specified as a deletion target,
wherein, in the operation of the deleting, in a case where a file is specified as the deletion target, from among the files related to the specified application, a file related to the application excluding the file that is to be treated as the deletion target exception is deleted by using the deletion target exception information, and
wherein, in the operation of the deleting, in a case where a directory is specified as the deletion target, from among the directories related to the specified application, a directory related to the application excluding the directory that is to be treated as the deletion target exception is deleted by using the deletion target exception information.

6. The image forming apparatus according to claim 1, wherein the general application is an application for retouching an image, and the system application is an application for managing an application.

7. A control method for an image forming apparatus having a storage configured to store deletion target exception information for identifying a file or a directory that is to be treated as a deletion target exception when a system application is deleted, the control method comprising:
specifying an application to be a deletion target from among a plurality of kinds of applications including a system application and a general application; and
deleting, from among files or directories related to the specified application, a file or a directory related to the application excluding the file or the directory that is to be treated as the deletion target exception by using the deletion target exception information,
wherein the general application is an application added to the image forming apparatus, the system application is an application that is able to be redeveloped from firmware, and the file that is to be treated as the deletion target exception when the system application is deleted is a license file of the general application.

8. The control method according to claim 7, wherein deleting includes from an application development area.

9. The control method according to claim 8, wherein, after deleting, the control method further comprises:
redeveloping the specified application into a new development area; and
copying the file or the directory that is to be treated as the deletion target exception is into the new development area by using the deletion target exception information.

10. The control method according to claim 9, wherein, after copying, the control method further comprises deleting the file or the directory that serves as the deletion target exception and is present in the development area before the copying.

11. The image forming apparatus according to claim 7,
wherein specifying includes specifying either a file or a directory as a deletion target,
wherein deleting includes, in a case where a file is specified as the deletion target, from among the files related to the specified application, deleting a file related to the application excluding the file that is to be treated as the deletion target exception by using the deletion target exception information, and
wherein deleting includes, in a case where a directory is specified as the deletion target, from among the directories related to the specified application, deleting a directory related to the application excluding the directory that is to be treated as the deletion target exception by using the deletion target exception information.

12. The image forming apparatus according to claim 7, wherein the general application is an application for retouching an image, and the system application is an application for managing an application.

13. A non-transitory computer-readable medium storing therein a program to cause a computer to perform a control method for an image forming apparatus having a storage configured to store deletion target exception information for identifying a file or a directory that is to be treated as a deletion target exception when a system application is deleted, the control method comprising:
- specifying an application to be a deletion target from among a plurality of kinds of applications including a system application and a general application; and
- deleting, from among files or directories related to the specified application, a file or a directory related to the application excluding the file or the directory that is to be treated as the deletion target exception by using the deletion target exception information,
- wherein the general application is an application added to the image forming apparatus, the system application is an application that is able to be redeveloped from firmware, and the file that is to be treated as the deletion target exception when the system application is deleted is a license file of the general application.

* * * * *